United States Patent
Ries et al.

(10) Patent No.: US 7,018,249 B2
(45) Date of Patent: Mar. 28, 2006

(54) BOAT PROPULSION SYSTEM

(75) Inventors: Günter Ries, Erlangen (DE); Bernd Wacker, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/497,141

(22) PCT Filed: Nov. 21, 2001

(86) PCT No.: PCT/DE02/04284

§ 371 (c)(1),
(2), (4) Date: May 28, 2004

(87) PCT Pub. No.: WO03/047961

PCT Pub. Date: Jun. 12, 2003

(65) Prior Publication Data

US 2005/0009418 A1    Jan. 13, 2005

(30) Foreign Application Priority Data

Nov. 29, 2001 (DE) ............................. 101 58 758

(51) Int. Cl.
*B60L 11/00* (2006.01)
(52) U.S. Cl. ........................... 440/6; 62/51.1
(58) Field of Classification Search .................. 440/6; 310/87; 62/47.1, 51.1
See application file for complete search history.

(56) References Cited

U.S. PATENT DOCUMENTS 2,714,866 A * 8/1955 Pleuger et al. ................. 440/6
2,790,098 A    4/1957 Nyyssonen .................. 310/202

(Continued)

FOREIGN PATENT DOCUMENTS

WO    WO 00/13296 A1    3/2000

(Continued)

OTHER PUBLICATIONS

Gamble et al., "High Temperature Superconducting Motors and Generators for Submarines and Surface Ships", Proceedings Naval Symposium on Electric Machines, Jul. 28-31, 1997, pp 275-282, XP 00800614.

(Continued)

*Primary Examiner*—Lars A. Olson (57) ABSTRACT

A boat propulsion system includes at least one propeller, at least one electric motor by which the at least one propeller can be driven, and one converter-fed power supply unit. The at least one electric motor can be supplied with electric power by the power supply unit which includes at least one prime mover and at least one generator powered by the prime mover. The at least one electric motor and the at least one generator of the power supply unit may be embodied as three-phase synchronous machines. In order to reduce the volume and weight of such a boat propulsion system while increasing its effectiveness, at least one of the electric motor and the at least one generator configured as a three-phase synchronous machine, includes a rotating excitation coil made of high-temperature super conductor wire. Each rotating excitation coil made of high-temperature super conductor wire is arranged in a vacuum-tight, insulated cryostat by which the rotating excitation coil made of high-temperature super conductor wire can be chilled to a temperature of 15 to 77 K.

38 Claims, 10 Drawing Sheets

U.S. PATENT DOCUMENTS

| | | | | |
|---|---|---|---|---|
| 4,578,962 A | * | 4/1986 | Dustmann | 62/47.1 |
| 4,926,647 A | * | 5/1990 | Dorri et al. | 62/51.1 |
| 5,216,889 A | * | 6/1993 | Herd et al. | 62/51.1 |
| 5,586,437 A | | 12/1996 | Blecher et al. | 62/47.1 |
| 6,389,821 B1 | * | 5/2002 | Strobel et al. | 62/47.1 |
| 6,438,969 B1 | * | 8/2002 | Laskaris et al. | 62/51.1 |
| 6,442,949 B1 | * | 9/2002 | Laskaris et al. | 62/51.1 |
| 6,485,339 B1 | * | 11/2002 | Hartig et al. | 440/6 |
| 6,553,773 B1 | * | 4/2003 | Laskaris | 62/47.1 |

FOREIGN PATENT DOCUMENTS

| | | |
|---|---|---|
| WO | WO 01/20750 A2 | 3/2001 |
| WO | WO 01/51863 A1 | 7/2001 |

OTHER PUBLICATIONS

Sharke P., "The Hunt for Compact Power", Geophysics, Society of Exploration Geophysicits. Tulsa, US, Apr. 2000, XP 8000664.

Wesskallnies B., "EIN Schiffsantrieb MIT Einem Supraleitenden Fahrmotor", Jahrbuch Der Schiffbautechischen Gesellschaft, Berlin, DE. vol. 83, 1990, pp 375-382, XP-002194070.

"Siemens-Schottel-Propulsor (SSP) The Podded Electric Drive with Permanently Excited Motor", Mar. 7, 1997 pp A-B, 1-24, p. 11, paragraph 4.2, p. 12, paragraph 4.3, figures 1-4, 7, and 10.

* cited by examiner

BOAT PROPULSION SYSTEM

This application is the national phase under 35 U.S.C. § 371 of PCT International Application No. PCT/DE02/04284 which has an International filing date of Nov. 21, 2002, which designated the United States of America and which claims priority on German Patent Application number DE 101 58 758.9 filed Nov. 29, 2001, the entire contents of which are hereby incorporated herein by reference.

FIELD OF THE INVENTION

The invention generally relates to a marine or boat propulsion system, having at least one vessel propeller. Preferably, it includes at least one electric motor, by which the at least one vessel propeller can be driven, and a converter-fed electrical power supply, by which the at least one electric motor can be supplied with electric power. It further preferably has at least one drive machine and at least one generator which can be driven by it. The at least one electric motor and the at least one generator for supplying electrical power are preferably in the form of three-phase synchronous machines.

BACKGROUND OF THE INVENTION

Diesel/electric marine propulsion systems are known, whose power supply has synchronous generators which are accommodated at some suitable point in the vessel's hull, and which themselves feed converter-fed synchronous or else asynchronous motors. The electric motors which drive the vessel propellers may, for example, be arranged as in-board motors, and may drive the vessel propellers via shaft systems.

Furthermore, pod propulsion systems are known, which have a synchronous motor with permanent-magnet excitation, arranged in a motor gondola which can be rotated. The motor gondola is arranged outside the vessel's hull and may have one or two vessel screws. The heat losses from the electric motor are in this case dissipated solely by the external surface of the motor gondola to the sea water. The asynchronous motors and generators have air/water heat exchangers.

Furthermore, JP 63217969 and JP 04304159 disclose marine propulsion systems for two vessel propellers including an associated so-called "homopolar motor", which comprises two disc rotors or cylindrical rotors through which direct current flows in opposite directions via brushes, and in which a torque is produced in the field of a superconducting coil.

SUMMARY OF THE INVENTION

An embodiment of the invention is based on an object of further-developing the marine propulsion system such that it can be designed to be at least one of more space-saving, more weight-saving, and/or to be more efficient.

According to an embodiment of the invention, an object may be achieved in that the at least one electric motor (which is in the form of a three-phase synchronous machine) and/or the at least one generator (which is in the form of a three-phase synchronous machine) for supplying electrical power have/has a rotating field winding composed of HTSL (high-temperature superconductor) wire. Further, each rotating field winding composed of HTSL wire is arranged in a cryostat, which is vacuum-insulated and can be cryogenically cooled by means of the rotating field winding composed of HTSL wire to a temperature between 15 and 77 K.

Without significantly changing the power levels and rotation speed values with pod marine propulsion systems as known from the prior art and the marine propulsion system according to an embodiment of the invention, the ratio between the diameter of the motor housing and the propeller external diameter in the case of the marine propulsion system according to an embodiment of the invention can be reduced to 30%, in comparison to 35 to 40% with the prior art. In comparison to marine propulsion systems which are known from the prior art and which weigh, for example, about 310 t in total, this weight can be reduced to 100 to 200 t by using the marine propulsion system according to an embodiment of the invention.

Furthermore, the efficiency of the electric motor for the marine propulsion system according to an embodiment of the invention can be increased to 99% in comparison to 97.5% in the case of marine propulsion systems as known from the prior art. The considerable reductions in the physical volume and the total weight, which amount to a factor of approximately two or more, lead either to the usable volume in the hull of the vessel being increased, or allow the hull of the vessel to be designed to be smaller for the same usable volume. The machine bases may be designed to be less complex, thus resulting in considerable financial advantages. Since the excitation is produced without any power consumption, the efficiency is better, and the cooling complexity is reduced.

According to one advantageous embodiment of the marine propulsion system according to the invention, the at least one electric motor (which is in the form of a three-phase synchronous machine) and/or the at least one generator (which is in the form of a three-phase synchronous machine) for supplying electrical power have/has an air gap three-phase winding composed of loomed copper conductors, which is arranged in an annular gap between a rotor and a laminated magnetic iron yoke. In the case of this stator air gap winding, no iron teeth are provided as a source of noise, so that the electric motors and the generators run more quietly.

The reduced weight of the rotor makes it possible to considerably reduce the vibration that occurs. The low synchronous reactance results in a very high short-term torque and stalling torque. An air gap of between 5 and 50 mm, which is larger than that with the prior art, is permissible between the rotor and the stator. The assembly process is considerably simplified, since wider tolerances are permissible for shaft bending, twisting due to vessel propeller forces, etc.

It has been found to be particularly advantageous for the HTSL wire of the rotating field winding to be formed from multifilament ribbon conductors $Bi_2 Ba_2 Sr_2 Cu_3 O_x$ or $Bi_2 Ba_2 SrCu_2 O_x$ in a silver or silver-alloy matrix, of $YBa_2 Cu_3 O_x$ as a thin film on steel strip, nickel strip, strip composed of an alloy containing nickel, silver strip or an $MgB_2$ superconductor.

In order to achieve electric motors of the HTSL type with external diameters which are as small as possible, it is expedient for the rotor (which has the rotating field winding composed of HTSL wire) of the at least one electric motor or generator (which is in the form of a three-phase synchronous machine) to have 6 to 12 poles, and preferably 8 poles.

According to one development of the marine propulsion system according to an embodiment of the invention, each cryostat can be supplied with coolant by way of a coolant circuit.

In order to improve the operational reliability of the cooling apparatus, each cryostat can advantageously be supplied with coolant by at least two redundant coolant circuits.

Cold helium or hydrogen gas is expediently provided as the coolant in the coolant circuit between a cold head and a transfer coupling to the cryostat.

Alternatively, the coolant circuit between a cold head and a transfer coupling to the cryostat may be designed on the cryo heatpipe principle, in which case the transfer coupling is then supplied with liquid coolant, such as liquid neon, liquid hydrogen, liquid nitrogen or a liquefied gas mixture, and vaporized coolant is fed back to the cold head.

The cold head of each coolant circuit can be operated in a simple manner by way of a closed-cycle compressed-gas circuit.

The cooling for the compressed-gas circuit for the cold head can once again be provided by way of a central cooling water supply, sea water, or indirectly by way of a heat exchanging device, which is itself thermally connected to outer surfaces of the vessel over which sea water washes.

If the marine propulsion system according to an embodiment of the invention is in the form of a pod propulsion system, with the at least one electric motor, which is in the form of a three-phase synchronous machine and has the rotating field winding composed of HTSL wire, is accommodated in a motor gondola which is arranged outside the vessel hull. The external diameter of the at least one electric motor may be less than 32% of the external diameter of the vessel propeller by virtue of the high power density which can be achieved in this way. This makes it possible to considerably improve the hydraulic efficiency of the pod propulsion system designed according to an embodiment of the invention, in comparison to the prior art.

If the cold head of each coolant circuit is arranged in an azimuth module (which can be rotated) of the pod propulsion system, it is easily accessible, and in which case, furthermore, there is no need for rotating couplings.

Alternatively, the cold head of each coolant circuit may be arranged in a strut module of the pod propulsion system, in which case it is also possible to achieve easy accessibility to the cooling system, in a maintenance-friendly manner.

Furthermore, when appropriate requirements exist, it is possible to arrange the cold head of each coolant circuit in the motor gondola of the pod propulsion system close to the transfer coupling via which coolant can be introduced into the cryostat which holds the rotating field winding composed of HTSL wire.

A further improvement in accessibility and thus in maintenance-friendliness of the cooling apparatus may be achieved. This can be achieved if the compressed-gas circuit is arranged together with the cold head on or within the azimuth module (which can be rotated) of the pod propulsion system.

The operational reliability of the pod propulsion system designed as described above can be increased if the cryostat of the single electric motor which is arranged in the motor gondola of the pod propulsion system can be supplied with coolant by use of two coolant circuits, each of which has an associated cold head. These two coolant circuits, which are designed as described above, are then mutually redundant with respect to the cooling of the cryostat.

If two co-rotating or contra-rotating (counter-rotating) vessel propellers are provided on the motor gondola of the pod propulsion system, each of which is associated with one of two independent electric motors which are arranged in the motor gondola and whose two rotors are arranged in, in each case, one cryostat, it is advantageously possible to achieve greater redundancy for the same volume as that for pod propulsion systems known from the prior art, with the capability for the two vessel propellers to contra-rotate making it possible to achieve better hydrodynamic efficiency.

In order to improve the operational reliability of the two electric motors which are arranged in the motor gondola, it is advantageous for the two cryostats to be connected to in each case one cold head via a respective coolant circuit.

The configuration of the cooling device can be simplified if the two cryostats are connected via a respective coolant circuit to a single cold head, which is shared by them.

Each cold head advantageously has a respective associated compressed-gas circuit.

The compressed-gas circuit may, for example, be cooled down by way of an integrated sea-water cooling circuit.

Alternatively, each compressed-gas circuit may be cooled down by way of an integrated fresh-water circuit, with a gas/water heat exchanger being provided for heat transmission from the compressed-gas circuit to the integrated fresh-water circuit.

The heat dissipation from the integrated fresh-water circuit can be achieved in a simple manner by this circuit having a further heat exchanger, by which it is thermally connected to sea water.

The transfer of the thermal energy from the integrated fresh-water circuit into the surrounding sea water can be achieved in a physically/technically less complex manner and nevertheless very effectively, by arranging the further heat exchanger for the integrated fresh-water circuit close to the wall of the strut module of the pod propulsion system, so that it can be cooled down by way of sea water via this wall.

Furthermore, if appropriate requirements exist, a refinement may be advantageous in which each compressed-gas circuit is equipped with an integrated gas/water heat exchanger, which is itself arranged close to the wall of the strut module of the pod propulsion system, is thermally connected to the latter, and can be cooled via the latter by way of sea water. This allows the amount of heat from the compressed-gas circuit to be emitted directly to the sea water without the interposition of further circuits.

In a further advantageous embodiment of the marine propulsion system according to an embodiment of the invention, the cold head or heads is or are arranged in the strut module, and the compressed-gas circuit or circuits is or are arranged in or on the azimuth module (which can be rotated) of the pod propulsion system.

Alternatively, the cold head or heads may be arranged in the motor gondola of the pod propulsion system close to the transfer coupling or couplings and the compressed-gas circuit or circuits is or are arranged in or on the azimuth module (which can be rotated) of the pod propulsion system.

Instead of the marine propulsion system according to an embodiment of the invention being in the form of a pod propulsion system, it is also possible for the at least one electric motor, which is in the form of a three-phase synchronous machine and has the rotating field winding composed of HTSL wire, to be accommodated in a propeller shaft pipe on one deck of the vessel.

Furthermore, the at least one electric motor, which is in the form of a three-phase synchronous machine and has the rotating field winding composed of HTSL wire, may be arranged as an in-board motor, by which the vessel propeller associated with it is driven via a shaft system.

The electrical power supply for the marine propulsion system can advantageously be formed by a drive machine and a generator, whose cryostat, which holds its rotating field winding, together with the cryostat of the electric motor can be supplied with coolant by use of a coolant circuit which is shared by the two cryostats.

In order to improve the operational reliability of the marine propulsion system, it is expedient to be possible to supply the cryostat for the generator, together with the cryostat for the electric motor, with coolant by way of two mutually redundant cooling circuits which are shared by the two cryostats.

In order to provide a coolant supply by the force of gravity in a simple manner, it is expedient for the cold head of each coolant circuit to be arranged in the vertical direction above that cryostat which is arranged at the highest point in the vertical direction and is supplied from this coolant circuit.

According to a further advantageous embodiment of the invention, each electric motor, which has its own coolant supply, in the motor gondola of the pod propulsion system is provided with its own electrical power supply.

BRIEF DESCRIPTION OF THE DRAWINGS

Further advantages, features and details of the invention will become evident from the description of illustrated embodiments given hereinbelow and the accompanying drawings, which are given by way of illustration only and thus are not limitative of the present invention, wherein.

DETAILED DESCRIPTION OF THE PREFERRED EMBODIMENTS

A first embodiment (which is illustrated in the form of a cross section in FIG. 1) of a marine propulsion system according to the invention in the form of a pod propulsion system 1 has a motor gondola 2 which is arranged underneath the hull 3 of the vessel, and which is illustrated by dashed lines and only partially in FIGS. 1 to 7.

Figure 1:
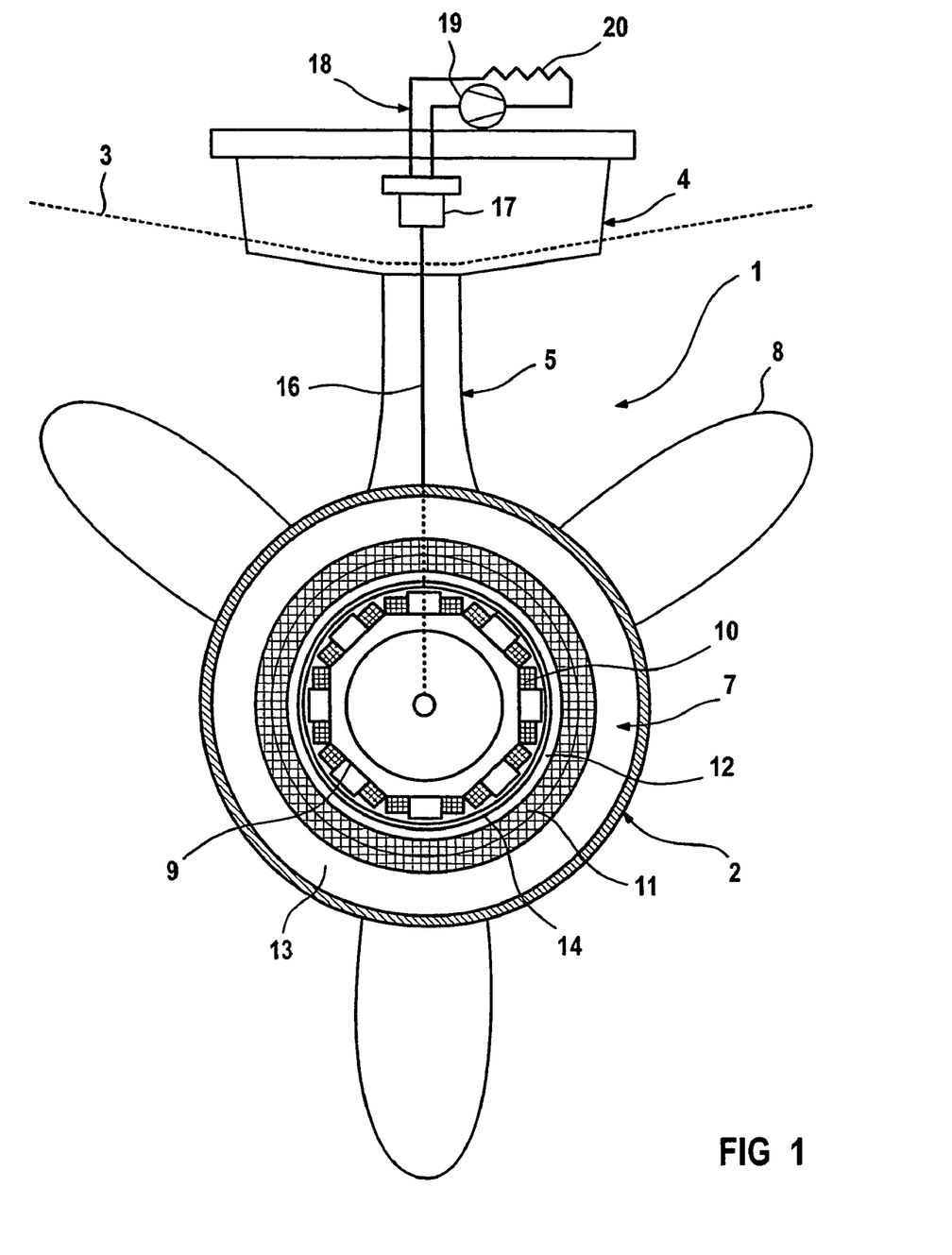
FIG. 1 shows a cross-section illustration of a first embodiment of a marine propulsion system according to the invention in the form of a pod propulsion system.

Within the hull 3 of the vessel, the pod propulsion system 1 has an azimuth module 4, which is firmly connected to the motor gondola by way of a strut module 5 through the hull 3 of the vessel.

The pod propulsion system 1 can be rotated about a vertical axis with respect to the hull 3 of the vessel, as can be seen from the circular arrows 6 in FIGS. 2 to 6.

The pod propulsion system 1 as shown in FIG. 1 has an electric motor 7 arranged within the motor gondola 2. A vessel propeller 8, which is arranged at the rear end of the motor gondola 2 such that it can rotate, is driven by means of this electric motor 7.

For this purpose, the electric motor 7 (which is in the form of a three-phase synchronous machine) has an 8-pole rotor 9, which is equipped with a rotating field winding 10 composed of HTSL (high-temperature superconductor) wire.

This HTSL wire may be formed from multifilament ribbon conductors $Bi_2 Ba_2 Sr_2 Cu_3 O_x$ or $Bi_2 Ba_2 Sr Cu_2 O_x$ in a silver or silver-alloy matrix, of $YBa_2 Cu_3 O_x$ as a thin film on steel strip, nickel strip, silver strip or an $MgB_2$ superconductor.

The electric motor 7 (which is in the form of a three-phase synchronous machine) furthermore has an air gap three-phase or stator winding 11 composed of loomed copper conductors, which is arranged in an annular gap 12 between the 8-pole rotor 9 (which is equipped with the rotating field winding 10 composed of HTSL wire) and a laminated magnetic iron yoke 13.

The 8-pole rotor 9 which has the rotating field winding 10 composed of HTSL wire is held within a cryostat 14, which is designed to be vacuum-insulated and can be cryogenically cooled by means of the rotating field winding 10 composed of HTSL wire to a temperature between 15 and 77 K.

The cryostat 14 is included in a coolant circuit 16 via a transfer coupling 15 which is arranged coaxially with respect to the longitudinal center axis of the 8-pole rotor 9. A cold head 17 is integrated in the coolant circuit 16 and is cooled on the basis of the Gifford-MacMahon, Stirling or Pulsetube principle by means of a compressed-gas circuit 18, which includes a compressor 19 and a gas/water heat exchanger or cooler 20.

The coolant circuit 16, which is provided by the cold head 17 on the one hand and the rotor-side or cryostat-side transfer coupling 15 on the other hand, may carry cold helium or hydrogen gas as the coolant. Furthermore, the coolant circuit 16 may be designed on the cryo heatpipe principle, in which case it is then supplied as the liquid coolant with liquid neon, liquid hydrogen, liquid nitrogen or a liquefied gas mixture to the cryostat 14 and to the transfer coupling 15, and feeds back vaporized neon, vaporized hydrogen, vaporized nitrogen or a vaporized gas mixture from the cryostat 14 and from the transfer coupling 15 to the cold head 17.

The compressed-gas circuit 18 including the cold head 17 is, in the exemplary embodiment illustrated in FIG. 1, accommodated in an easily accessible manner on or within the azimuth module 4 (which can be rotated) of the pod propulsion system 1, so that there is no need for rotary couplings.

Figure 2:
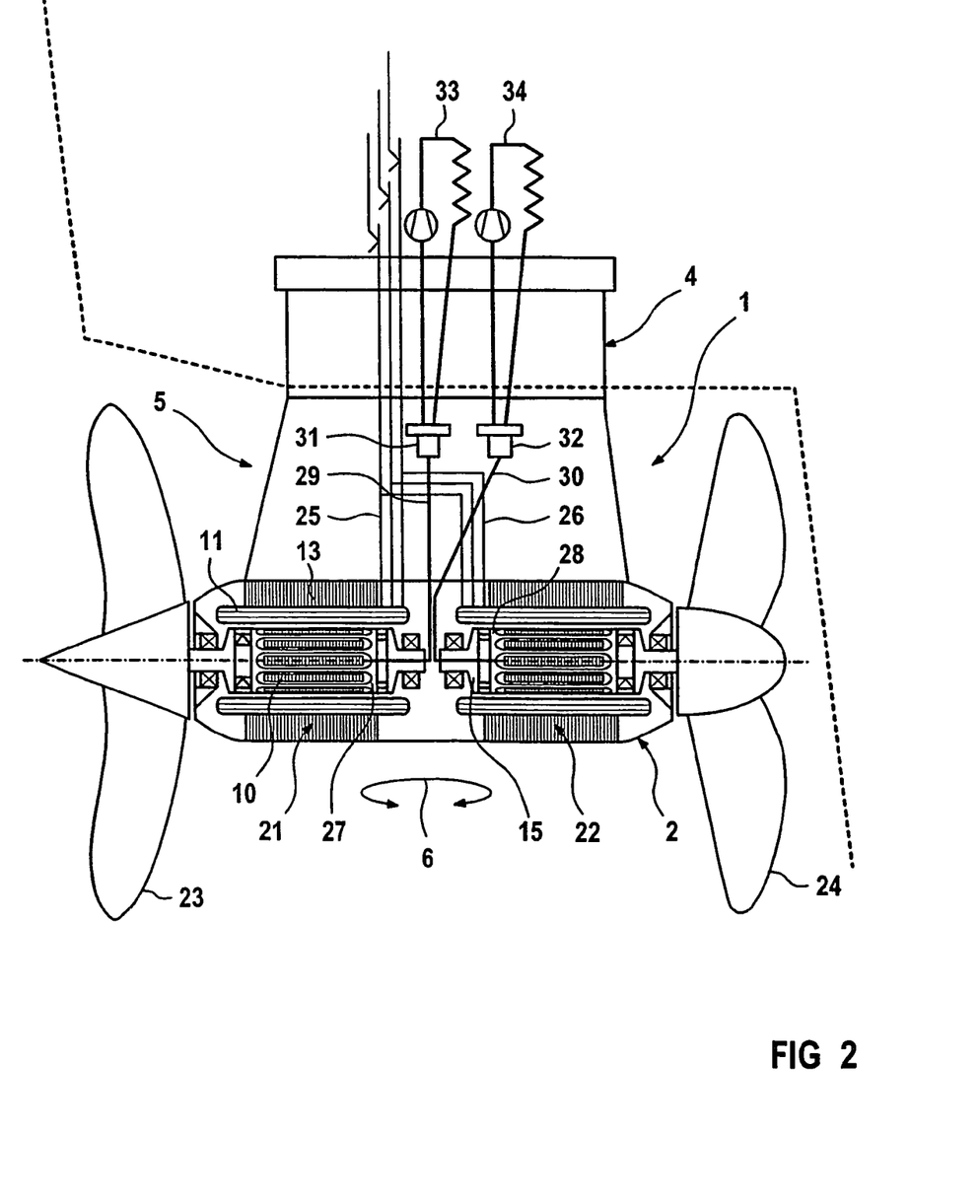
FIG. 2 shows a longitudinal section illustration of a second embodiment of the marine propulsion system according to the invention in the form of a pod propulsion system.

An embodiment of the pod propulsion system 1, shown in the form of a longitudinal section in FIG. 2, has two mutually independent electric motors 21, 22, by which two vessel propellers 23, 24 are driven, which are mounted such that they can rotate at the front end and rear end of the motor gondola 2. The vessel propellers 23, 24 may be oriented such that they contra-rotate. FIG. 2 also shows the two three-phase supply lines 25, 26 for the two electric motors 21, 22. Each electric motor 21, 22 has a separate cryostat 27, 28. Each cryostat 27, 28 is connected via transfer couplings 15 to a coolant circuit 29, 30, with a respective cold head 31 or 32 being arranged in the respective coolant circuit 29 or 30. Each respective cold head 31 or 32 is in turn associated with a respective compressed-gas circuit 33 or 34.

The two compressed-gas circuits 33, 34 are arranged in the azimuth module 4, and the two cold heads 31, 32 are arranged in the strut module 5 of the pod propulsion system 1, so that they are easily accessible and are maintenance-friendly. The provision of two electric motors 21, 22 whose 8-pole rotors 9 are supplied with coolant independently of one another results in better availability of the pod propulsion system 1 in comparison to the embodiment shown in FIG. 1.

The availability can be increased if the electrical power supply for each electric motor 21, 22 is provided individually via respectively separate sliprings or converters. FIG. 2 shows only a single converter supply, which supplies both electric motors 21, 22 at the same time.

Figure 3:
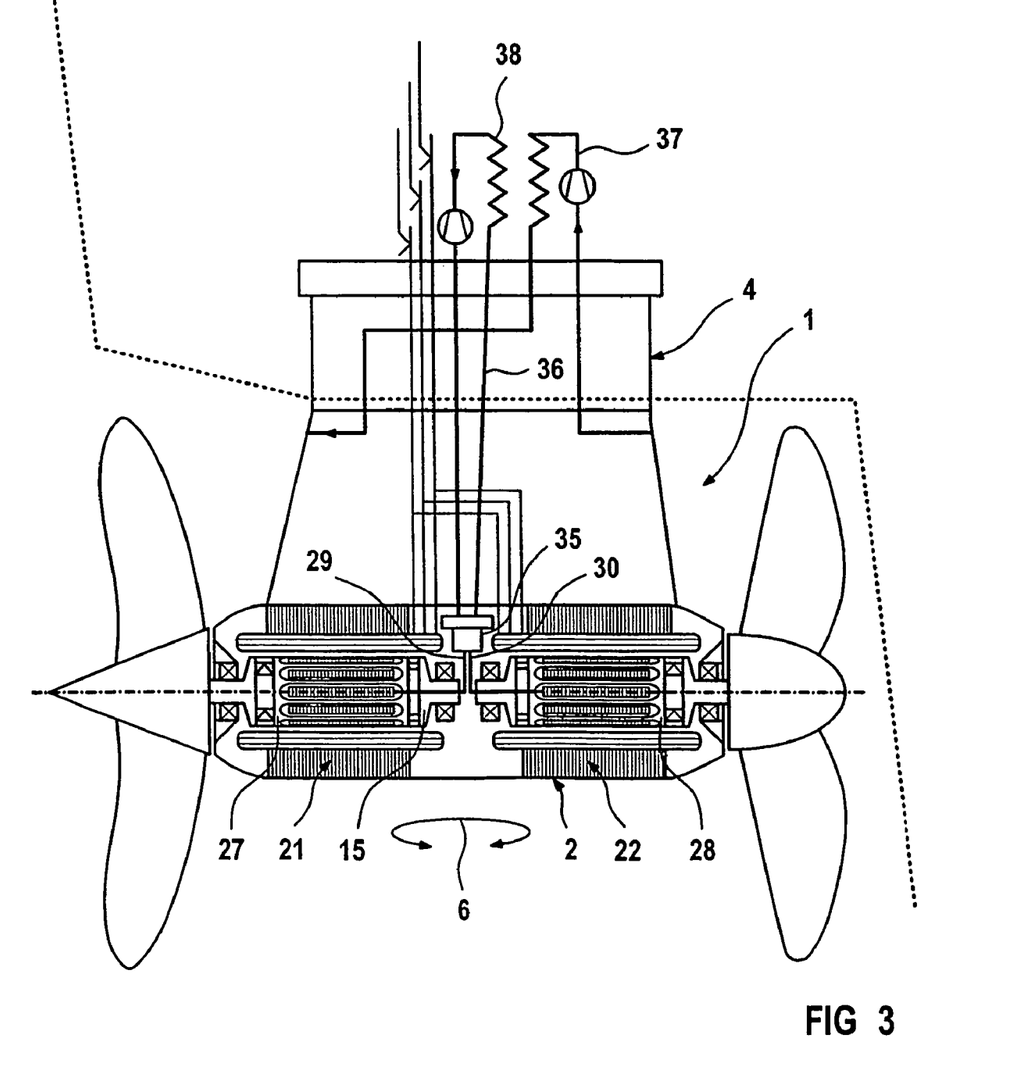
FIG. 3 shows a longitudinal section illustration of a third embodiment of the marine propulsion system according to the invention in the form of a pod propulsion system.

FIG. 3 shows a modified form of the pod propulsion system 1 as shown in FIG. 2, in the form of a longitudinal section, in which the cryostats 27, 28 of the two electric motors 21, 22 are supplied with coolant by way of the two coolant circuits 29, 30. The two coolant circuits 29, 30 are however, in contrast to FIG. 2, connected to a cold head 35 which is shared by them and is arranged close to the two transfer couplings 15 of the cryostats 27, 29 in the motor gondola 2 of the pod propulsion system 1.

The cold head 35 is itself cooled by a compressed-gas circuit 36, whose major components are arranged in or fitted to the azimuth module 4 of the pod propulsion system 1.

The compressed-gas circuit 36 is cooled by use of an integrated sea-water cooling circuit 37, which extracts thermal energy from the compressed-gas circuit 36 via a heat exchanger unit 38. The major components of the integrated sea-water cooling circuit 37 are also arranged in or on the azimuth module 4 of the pod propulsion system 1.

The components which are provided for supplying coolant circuits 29, 30 which are associated with the cryostats 27, 28 may also be designed in redundant or duplicated form in order to improve the operational reliability, as shown in the embodiment in FIG. 3.

Figure 4:
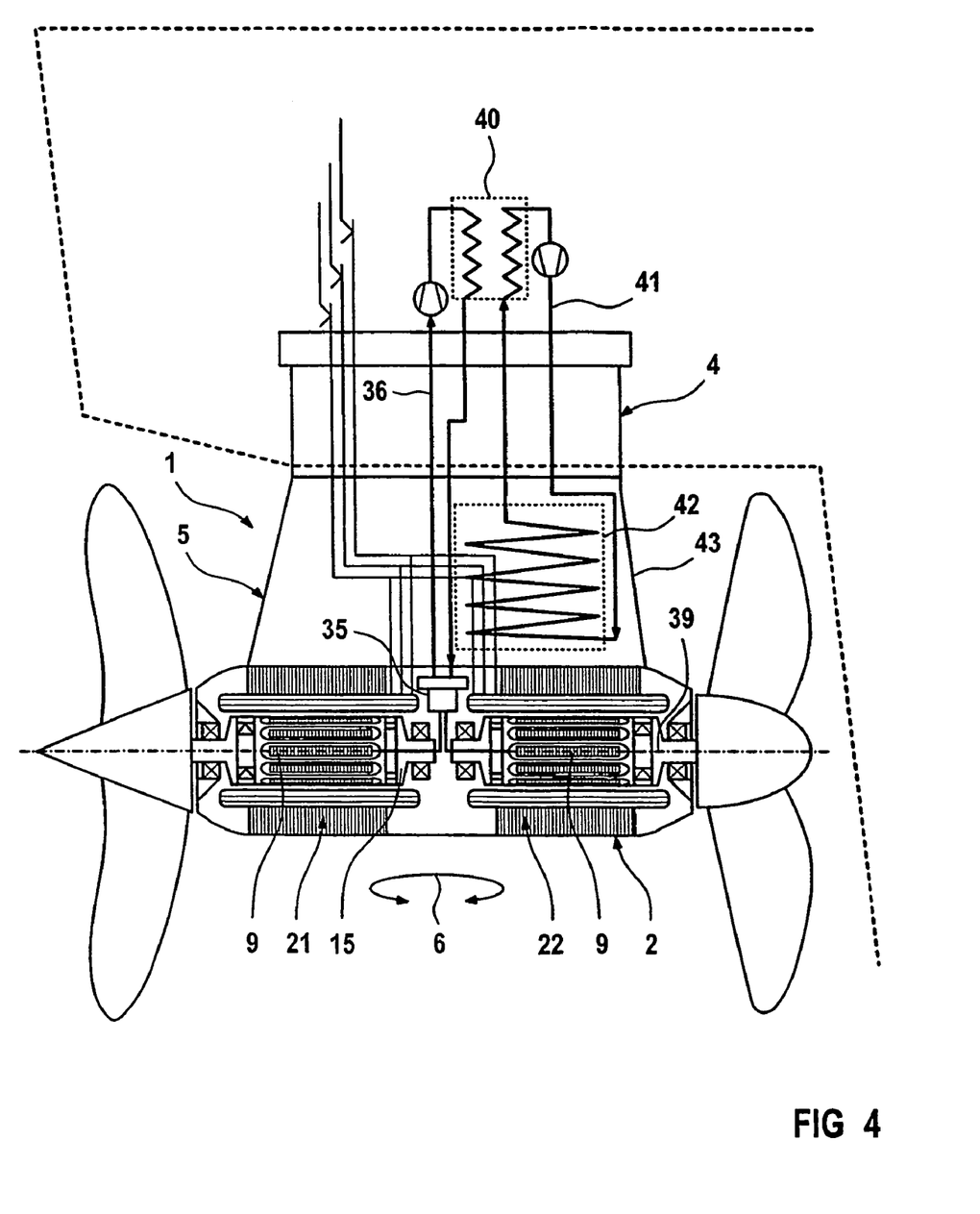
FIG. 4 shows a longitudinal section illustration of a fourth embodiment of the marine propulsion system according to the invention in the form of a pod propulsion system.

In the case of the embodiment of the pod propulsion system 1 shown in FIG. 4, the cold head 35 is also arranged in the motor gondola 2, close to the transfer couplings 15 which are arranged coaxially with respect to the rotor axis 39 of the rotors 9 of the two electric motors 21, 22. The compressed-gas circuit 36, which is associated with the cold head 35, is cooled down by means of a gas/water heat exchanger 40, which is arranged in the compressed-gas circuit 36 and is also a component of an integrated fresh-water circuit 41.

The integrated fresh-water circuit 41 is cooled by way of a further heat exchanger 42, which is thermally connected to the wall 43 of the strut module 5 of the pod propulsion system 1. The further heat exchanger 42 in the integrated fresh-water circuit 41 is thus cooled down by use of sea water through the wall 43 of the strut module 5 of the pod propulsion system 1.

The major components both of the compressed-gas circuit 36 and of the integrated fresh-water circuit 41 are arranged in a maintenance-friendly manner in the azimuth module 4 of the pod propulsion system 1, while in contrast the cold head 35 is, as already mentioned above, seated in the motor gondola 2 of the pod propulsion system 1.

Alternatively, two cold heads 35 may be provided, each of which is associated with a respective one of the two electric motors 21, 22, and both of which may be cooled down by way of the compressed-gas circuit 36.

Figure 5:
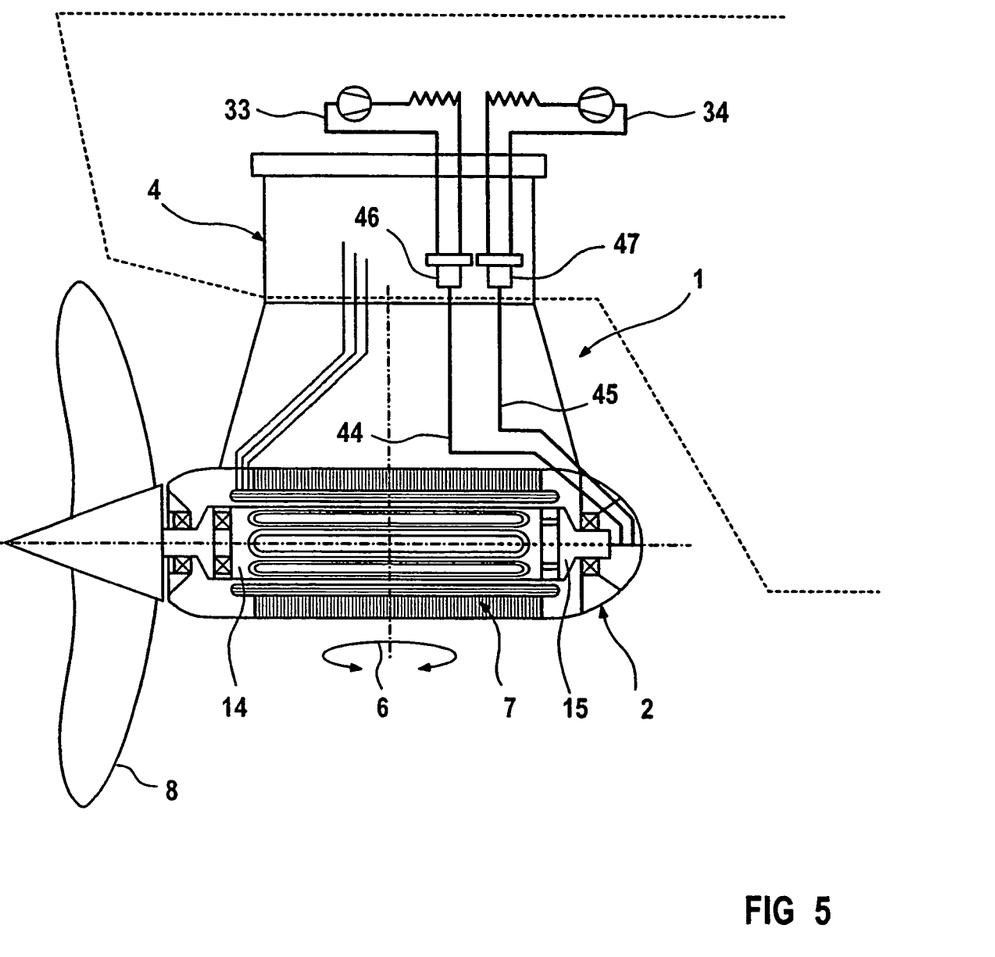
FIG. 5 shows a longitudinal section illustration of a fifth embodiment of the marine propulsion system according to the invention in the form of a pod propulsion system.

The pod propulsion system 1 which is shown in FIG. 5 has an electric motor 7 which drives the single vessel propeller 8 of the pod propulsion system 1, and occupies virtually the entire interior (whose diameter is constant) of the motor gondola 2 of the pod propulsion system 1. In comparison to the pod propulsion systems equipped with two electric motors as shown in FIGS. 2 to 4, in the case of the embodiment shown in FIG. 5, the length of the motor gondola 2 is made better use of for installation of a higher motor power.

The cryostat 14 of the electric motor 7 is connected by way of the transfer coupling 15 to two coolant circuits 44, 45, which are based on the cryo heatpipe principle, and which have a respectively associated cold head 46 and 47. The two cold heads 46, 47 are arranged in the azimuth module 4 of the pod propulsion system, and are cooled down by way of compressed-gas circuits 33, 34, which are likewise provided in the azimuth module 4 of the pod propulsion system 1. The redundancy which is provided by the duplicated form of the components which are provided for cooling of the electric motor 7 improves the operational reliability of the pod propulsion system 1.

Figure 6:
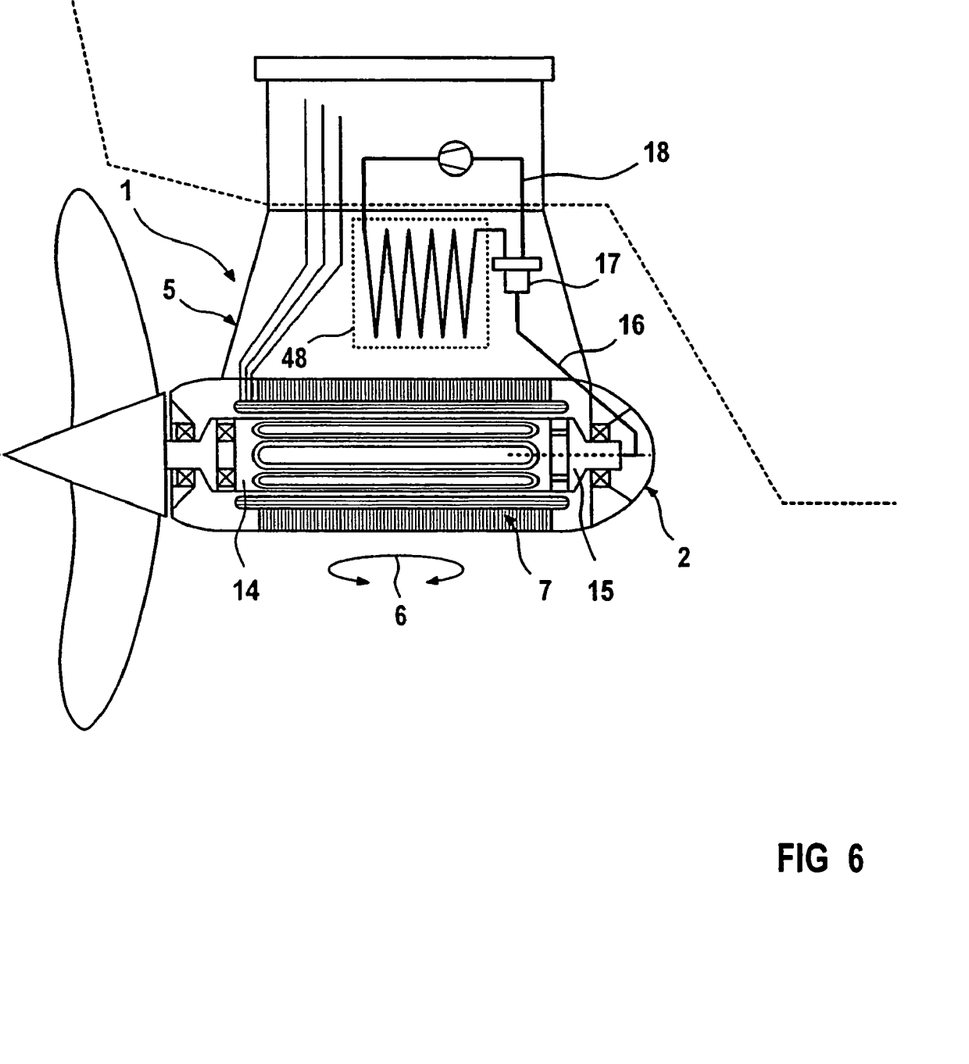
FIG. 6 shows a longitudinal section illustration of a sixth embodiment of the marine propulsion system according to the invention in the form of a pod propulsion system.
Figure 7:
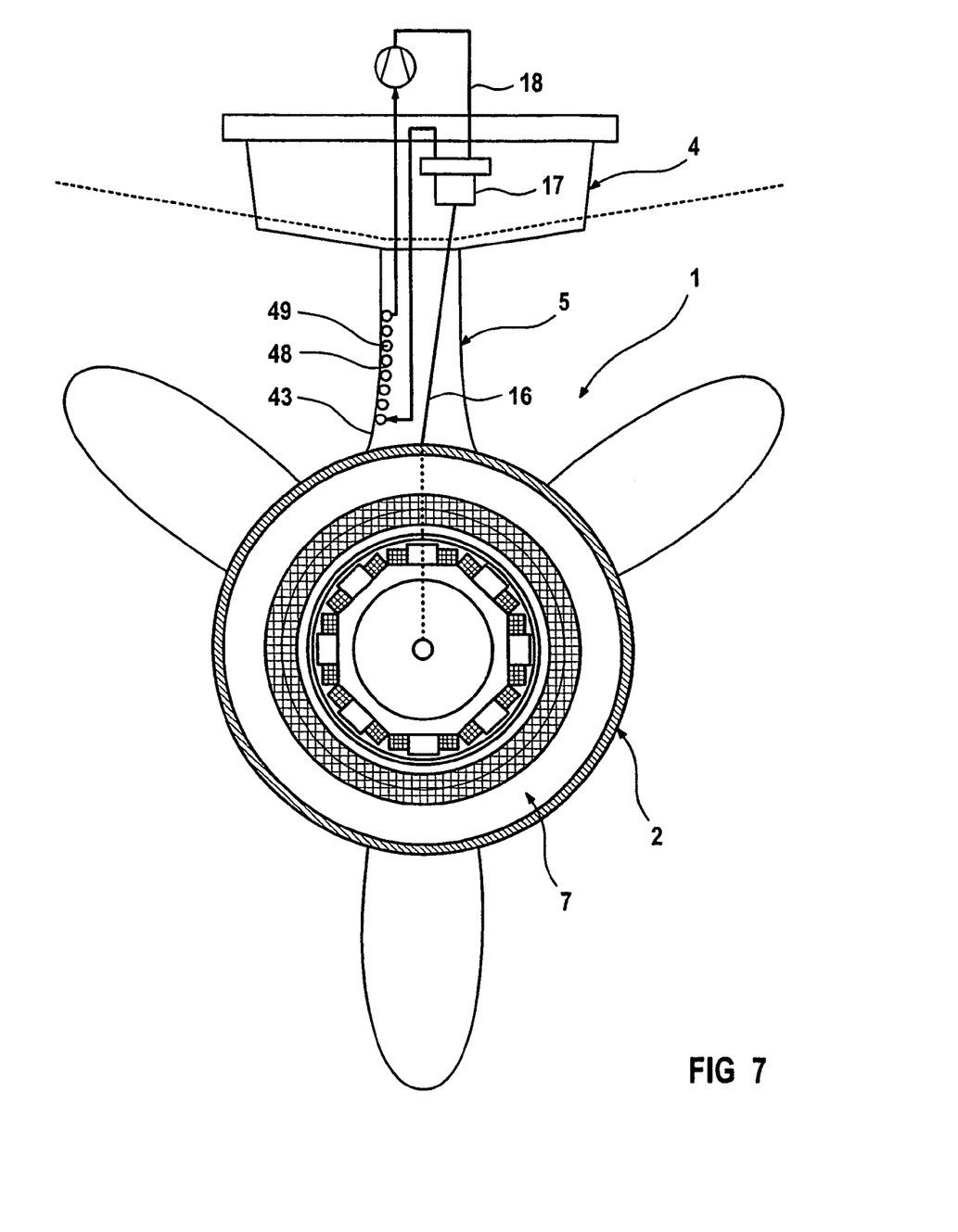
FIG. 7 shows a cross-section illustration of the sixth embodiment, as shown in FIG. 6, of the marine propulsion system according to the invention in the form of a pod propulsion system.

In embodiments of the pod propulsion system 1, illustrated as longitudinal sections and cross sections respectively in FIGS. 6 and 7, the cryostat 14 of the single electric motor 7 which is arranged in the motor gondola 2 is supplied with coolant from a coolant circuit 16 by the transfer coupling 15. The cold head 17, which is associated with the coolant circuit 16, is arranged in the strut module 5 in the case of the embodiment shown in FIG. 6, and is arranged in the azimuth module 4 of the pod propulsion system 1 in the case of the embodiment shown in FIG. 7. In both embodiments, the cold head 17 is cooled down by means of a compressed-gas circuit 18, with an integrated gas/water heat exchanger 48 being used to extract heat from this compressed-gas circuit 18. This gas/water heat exchanger 48 is arranged on the wall 43 of the strut module 5, as can be seen in particular in FIG. 7.

This gas/water heat exchanger 48 is thermally connected in a corresponding manner to the wall 43 of the strut module 5, and thus to the sea water surrounding the strut module 5. In the embodiments shown in FIG. 6 and FIG. 7, the compressed-gas circuit is cooled down directly by the sea water, in which case the heat exchanger pipe runs 49 in the gas/water heat exchanger 48 can be arranged directly against the wall 43 of the strut module 5.

Figure 8:
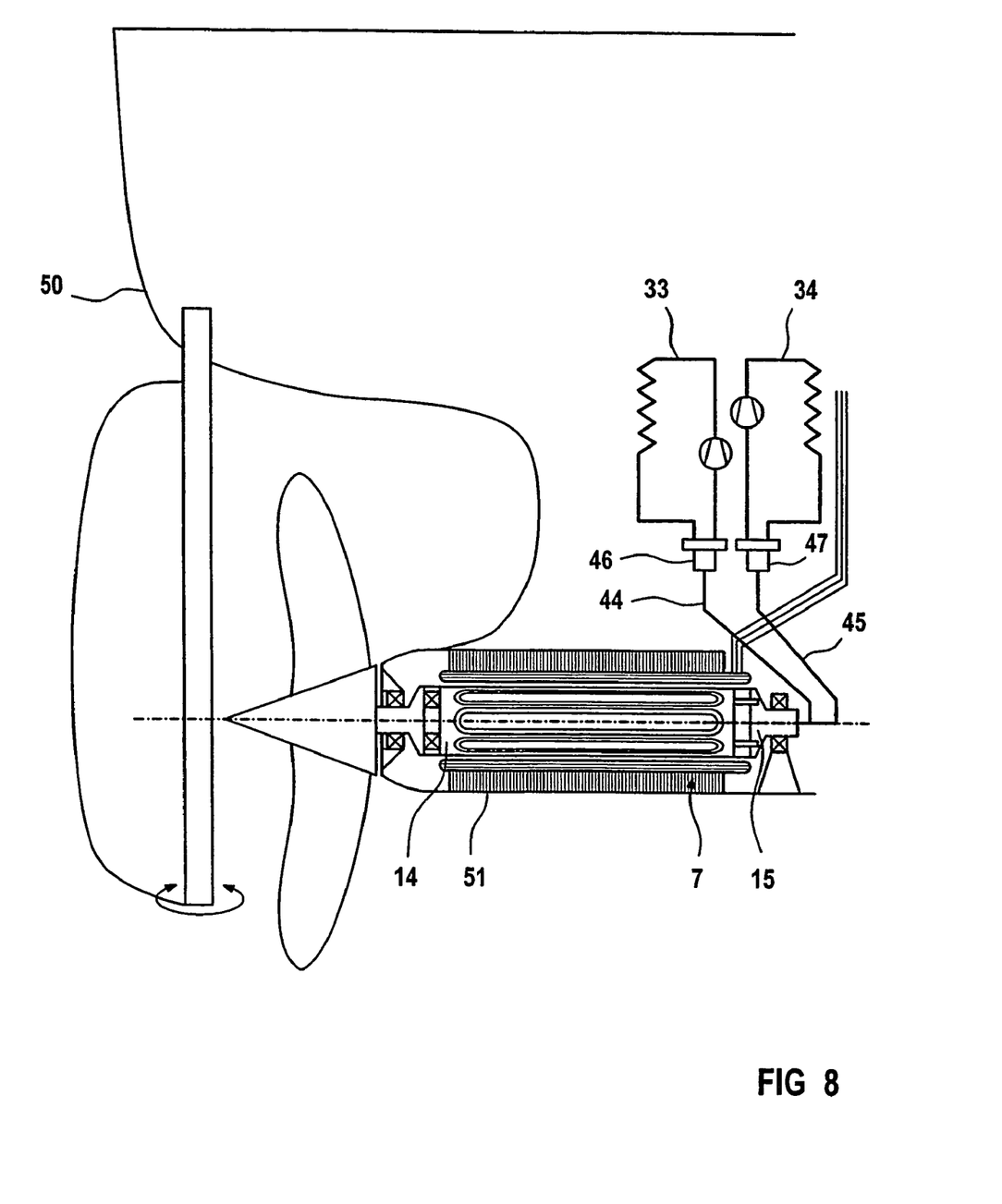
FIG. 8 shows a longitudinal section illustration of a marine propulsion system according to the invention arranged in a propeller shaft pipe at the stern of the ship.
Figure 9:
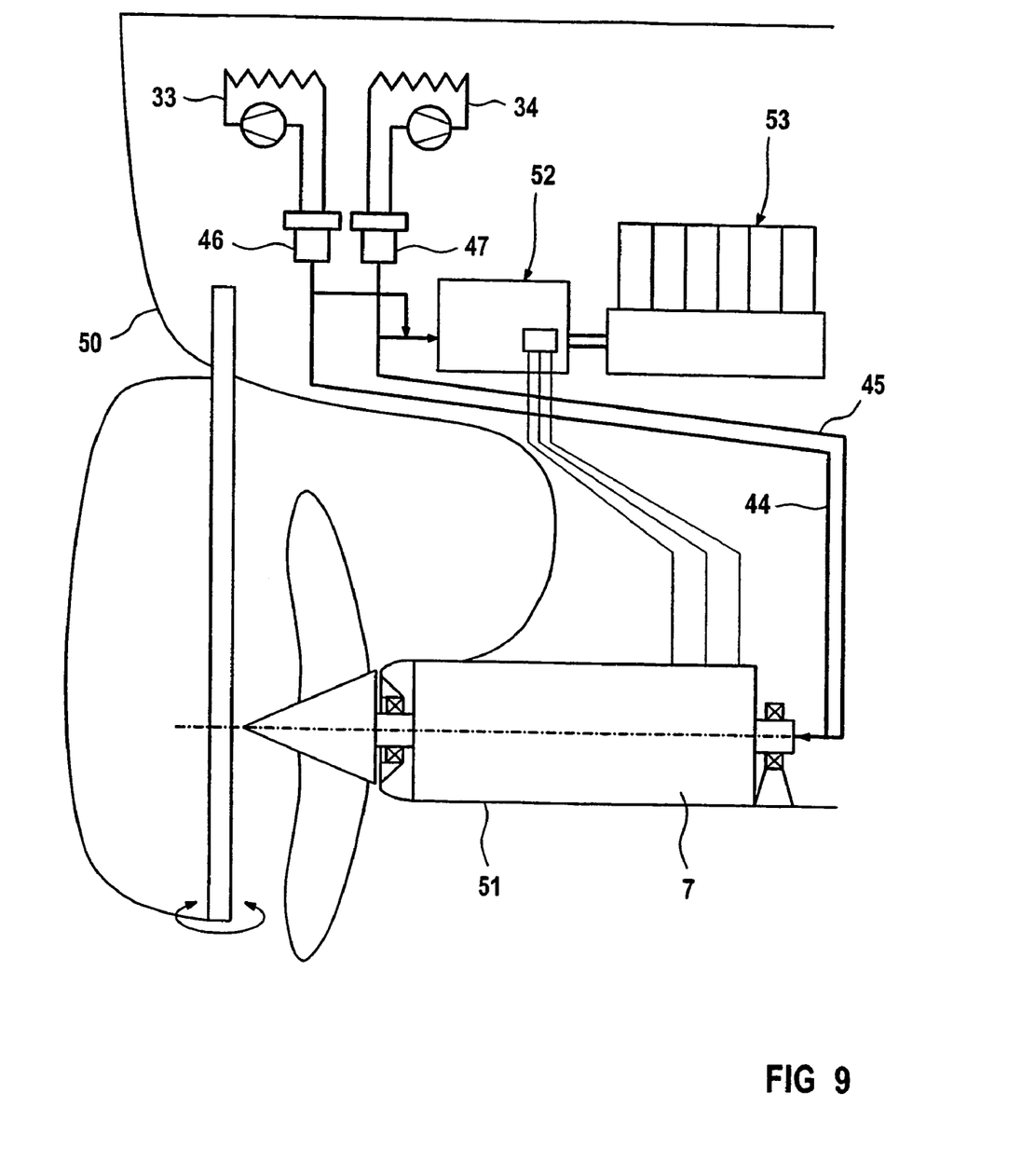
FIG. 9 shows a longitudinal view of a further embodiment of the marine propulsion system according to the invention arranged in the propeller shaft pipe at the stern of the ship.

In the embodiments shown in FIGS. 8 and 9, an electric motor 7 for the marine propulsion system is arranged fixed in a propeller shaft pipe 51, which is formed at the stern 50 of the vessel. The cryostat 14 of the electric motor 7 is connected by way of the transfer coupling 15 to two coolant circuits 44, 45, which have a respective cold head 46, 47. The two cold heads 46, 47 are respectively cooled down by a compressed-gas circuit 33, 34. The cooling of the cryostat 14 of the electric motor 7 is thus redundant.

In addition to the electric motor 7 for the marine propulsion system, FIG. 9 also shows a power generating system with a generator 52, which is driven by a drive machine in the form of an internal combustion engine 53.

The generator 52 has a rotor, which is not illustrated in detail in the figures, with a rotating field winding composed of HTSL wire, with the cryostat for the generator 52 being supplied with coolant in a redundant manner both by the coolant circuit 44 and by the coolant circuit 45, as can be seen in FIG. 9. Alternatively, it is possible to supply the generator 52 and the electric motor 7 by way of a single coolant circuit and the associated system parts.

The cold heads 46, 47 which are shown in FIG. 9 are arranged on a higher deck than the load that is arranged at the highest point, so that the coolant can be supplied by the force of gravity via the coolant circuits 44, 45, which are designed on the basis of the cryo heatpipe principle.

Alternatively, the coolant circuits 44, 45 may also be in the form of separate liquid and cold-gas lines.

Figure 10:
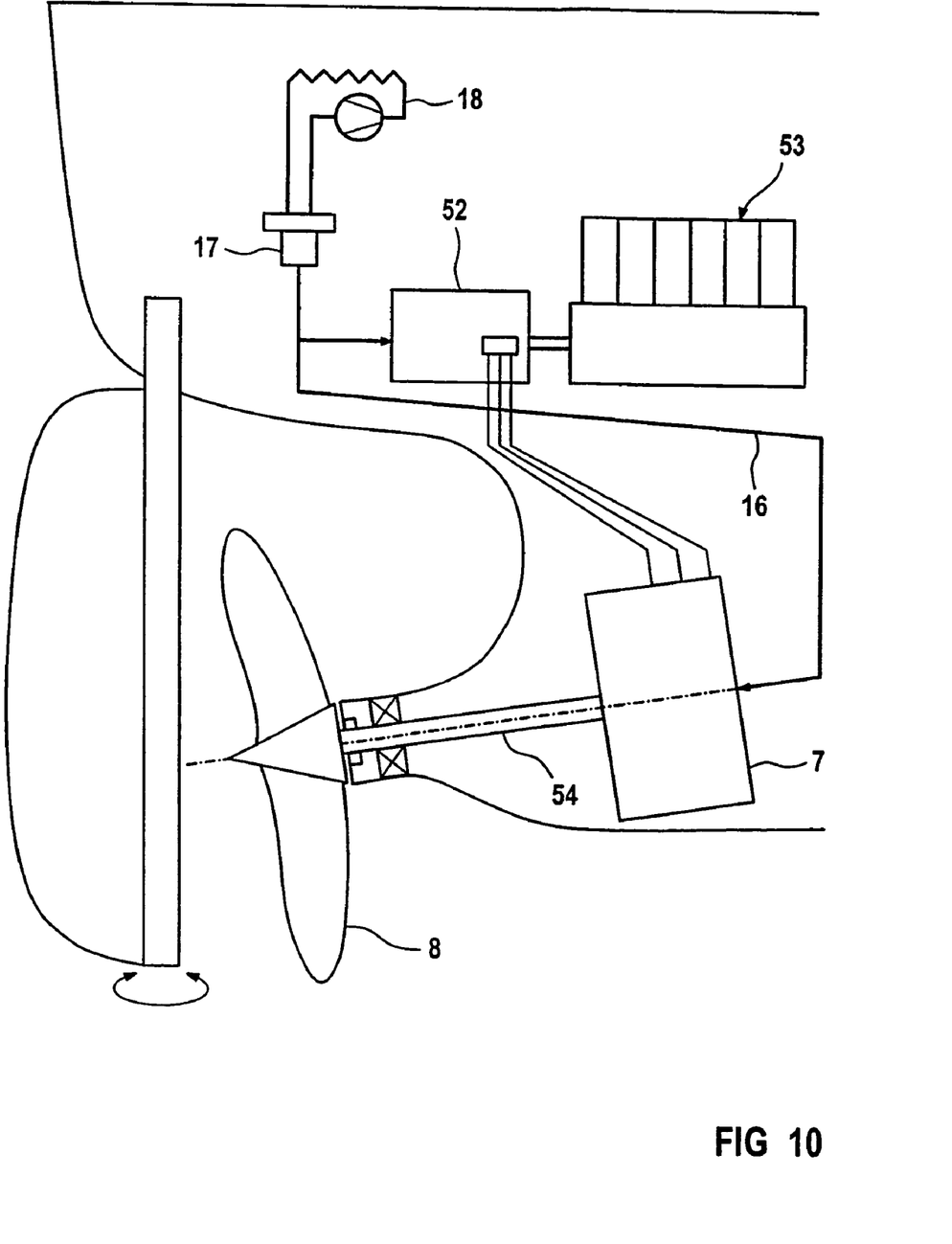
FIG. 10 shows a longitudinal view of a marine propulsion system according to the invention, equipped with an inboard motor.

In the embodiment of the marine propulsion system according to the invention as illustrated in FIG. 10, the electric motor 7 is in the form of an in-board motor, on the output side driving a shaft system 54, which itself rotates the vessel propeller 8.

An internal combustion engine 53 is provided as the drive machine for the marine propulsion system, drives the generator 52, and may be in the form of a diesel engine, a gas turbine or a steam turbine.

The generator 52 and the electric motor 7 each have a rotor with a rotating field winding composed of HTSL wire. The two cryostats of the generator 52 and of the electric motor 7 are supplied with coolant by way of a coolant circuit 16, with the cold head 17 in the coolant circuit 16 being cooled down by way of the compressed-gas circuit 18. The cold head 17 is arranged above the highest coolant load, so that—as in the case of the embodiment shown in FIG. 9—the coolant can be supplied by the force of gravity.

According to one exemplary embodiment of a pod propulsion system, a drive stage (equipped with two electric motors of the HTSL type) for a pod propulsion system 1 has a rating of 20 MW at 130 rpm. The available rotation speed range is between 70 and 160 rpm. The external diameter of the vessel propeller is 6250 mm. The external diameter of the motor housing and of the motor gondola of the pod propulsion system is 30% of the external diameter of the vessel propeller. The overall length of the pod propulsion system is approximately 11 000 mm. The vessel propeller torque is approximately 1480 kNm. The weight of the entire system is approximately 100 to 200 t, with the efficiency of the motor stage being approximately 99%.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A marine propulsion system, comprising:
   at least one vessel propeller;
   at least one electric motor by which the at least one vessel propeller is drivable;
   a converter-fed electrical power supply, adapted to supply electric power to the at least one electric motor, including,
   at least one drive machine, and
   at least one generator, adapted to be driven by the at least one drive machine, wherein
      at least one of the at least one electric motor and the at least one generator are in the form of three-phase synchronous machines,
      at least one of the at least one electric motor and the at least one generator includes a rotating field winding composed of high-temperature superconductor (HTSL) wire,
      each rotating field winding is arranged in a cryostat which is vacuum-insulated and by which the rotating field winding is cryogenically coolable to a temperature between 15 and 77 K,
      at least one of the at least one electric motor and the at least one generator includes an air gap three-phase winding composed of loomed copper conductors, arranged in an annular gap between a rotor and a laminated magnetic iron yoke, and
      the rotor, including the rotating field winding composed of HTSL wire, includes 6 to 12 poles.

2. The marine propulsion system as claimed in claim 1, wherein the HTSL wire of the rotating field winding is formed from multifilament ribbon conductors Bi2 Ba2 Sr2 Cu3 Ox or B2 Ba2 SrCu2 Ox in at least one of a silver and silver-alloy matrix, of YBa2 Cu3 Ox as a thin film on steel strip, nickel strip, strip composed of an alloy containing nickel, silver strip or an MgB2 superconductor.

3. The marine propulsion system as claimed in claim 1, wherein each cryostat is supplyable with coolant via a coolant circuit.

4. The marine propulsion system as claimed in claim 1, wherein cryostats are supplyable with coolant via at least two redundant coolant circuits.

5. The marine propulsion system as claimed in claim 3, wherein at least one of cold helium and hydrogen gas is provided as the coolant in the coolant circuit between a cold head and a transfer coupling to the cryostat.

6. The marine propulsion system as claimed in claim 3, wherein the coolant circuit between a cold head and a transfer coupling to the cryostat is designed on the cryo heatpipe principle, so that the transfer coupling is supplied with a liquid coolant including at least one of liquid neon, liquid hydrogen, liquid nitrogen and a liquefied gas mixture, and vaporized coolant is fed back to the cold head.

7. The marine propulsion system as claimed in claim 5, wherein the cold head of each coolant circuit is operatable via a closed-cycle compressed-gas circuit.

8. The marine propulsion system as claimed in claim 7, wherein the compressed-gas circuit for the cold head is cooled down by at least one of a central cooling water supply, sea water, and indirectly, via a heat exchanging device, thermally connected to outer surfaces of the vessel over which sea water washes.

9. The marine propulsion system as claimed in claim 1, wherein the marine propulsion system is in the form of a pod propulsion system, wherein the at least one electric motor is accommodated in a motor gondola arranged outside the vessel hull.

10. The marine propulsion system as claimed in claim 9, wherein a cold head of each coolant circuit is arranged in an azimuth module of the pod propulsion system.

11. The marine propulsion system as claimed in claim 9, wherein a cold head of each coolant circuit is arranged in a strut module of the pod propulsion system.

12. The marine propulsion system as claimed in claim 9, wherein a cold head of each coolant circuit is arranged in the motor gondola of the pod propulsion system close to the transfer coupling via which coolant is introduceable into the cryostat which holds the rotating field winding composed of HTSL wire.

13. The marine propulsion system as claimed in claim 9, wherein the compressed-gas circuit together with the cold head,
 is arranged at least one of on and within the azimuth module of the pod propulsion system.

14. The marine propulsion system as claimed in claim 9, wherein the cryostat of the single electric motor arranged in the motor gondola of the pod propulsion system, is suppliable with coolant via two coolant circuits, each including an associated cold head.

15. The marine propulsion system as claimed in claim 9, wherein two at least one of co-rotating and contra-rotating vessel propellers are arranged on the motor gondola of the pod propulsion system, each associated with one of two independent electric motors arranged in the motor gondola and whose two rotors are arranged in one cryostat.

16. The marine propulsion system as claimed in claim 14, wherein the two cryostats are connected to a respective cold head via a respective coolant circuit.

17. The marine propulsion system as claimed in claim 15, wherein the two cryostats are connected via a respective coolant circuit to a single cold head, shared by them.

18. The marine propulsion system as claimed in claim 5, wherein each cold head is associated with a respective compressed-gas circuit.

19. The marine propulsion system as claimed in claim 7, wherein each compressed-gas circuit includes an associated integrated sea-water cooling circuit.

20. The marine propulsion system as claimed in claim 7, wherein each compressed-gas circuit includes an associated integrated fresh-water circuit, with a gas/water heat exchanger being provided in order to transfer heat from the compressed-gas circuit to the integrated fresh-water circuit.

21. The marine propulsion system as claimed in claim 20, wherein the integrated fresh-water circuit includes a further heat exchanger, via which it is thermally connected to sea water.

22. The marine propulsion system as claimed in claim 21, wherein the further heat exchanger of the integrated fresh-water circuit is arranged close to the wall of the strut module of the pod propulsion system, and is coolable by sea water via the wall.

23. The marine propulsion system as claimed in claim 9, wherein each compressed-gas circuit includes an integrated gas/water heat exchanger arranged close to the wall of the strut module of the pod propulsion system, is thermally connected to a strut module of the pod propulsion system, and is coolable via the latter by use of sea water.

24. The marine propulsion system as claimed in claim 11, wherein the at least one cold head is arranged in the strut module, and the at least one compressed-gas circuit is arranged at least one of in and on the azimuth module of the pod propulsion system.

25. The marine propulsion system as claimed in claim 12, wherein the at least one cold head is arranged in the motor gondola of the pod propulsion system close to the at least one transfer coupling, and the at least one compressed-gas circuit is arranged at least one of in and on the azimuth module of the pod propulsion system.

26. The marine propulsion system as claimed in claim 1, wherein the electrical power supply for the marine propulsion system is formed by a power machine and a generator, whose cryostat, which holds its rotating field winding, together with the cryostat of the electric motor is suppliable with coolant by a coolant circuit shared by the two cryostats.

27. The marine propulsion system as claimed in claim 1, wherein the electrical power supply for the marine propulsion system is formed by a power machine and a generator, whose cryostat, which holds its rotating field winding, together with the cryostat of the electric motor are suppliable with coolant by two coolant circuits, which are mutually redundant and are shared by the two cryostats.

28. The marine propulsion system as claimed in claim 5, wherein the cold head in each coolant circuit is arranged in the vertical direction above that cryostat which is arranged at the highest point in the vertical direction.

29. The marine propulsion system as claimed in claim 9, wherein each electric motor, including its own coolant supply, in the motor gondola of the pod propulsion system also includes its own associated electrical power supply.

30. The marine propulsion system as claimed in claim 1, wherein the rotor, including the rotating field winding composed of HTSL wire, includes 8 poles.

31. The marine propulsion system as claimed in claim 4, wherein at least one of cold helium and hydrogen gas is provided as the coolant in the coolant circuit between a cold head and a transfer coupling to the cryostat.

32. The marine propulsion system as claimed in claim 3, wherein the coolant circuit between a cold head and a transfer coupling to the cryostat is designed on the cryo heatpipe principle, so that the transfer coupling is supplied with a liquid coolant including a least one of liquid neon, liquid hydrogen, liquid nitrogen and a liquefied gas mixture, and vaporized coolant is fed back to the cold head.

33. The marine propulsion system as claimed in claim 6, wherein the cold head of each coolant circuit is operatable via a closed-cycle compressed-gas circuit.

34. The marine propulsion system as claimed in claim 10, wherein the compressed-gas circuit together with the cold head, is arranged at least one of on and within the azimuth module of the pod propulsion system.

35. A marine propulsion system, comprising:
 at least one vessel propeller;
 at least one electric motor by which the at least one vessel propeller is drivable;
 a converter-fed electrical power supply, adapted to supply electric power to the at least one electric motor, including,
  at least one drive machine; and
  at least one generator, adapted to be driven by the at least one drive machine, wherein
   at least one of the at least one electric motor and the at least one generator are in the form of three-phase synchronous machines, and wherein at least one of the at least one electric motor and the at least one generator includes a rotating field winding composed of high-temperature superconductor (HTSL) wire,
   each rotating field winding is arranged in a cryostat which is vacuum-insulated and by which the rotating field winding is cryogenically coolable to a temperature between 15 and 77 K, and
   the at least one electric motor, in the form of a three-phase synchronous machine and including the rotating field winding composed of HTSL wire, is accommodated in a propeller shaft pipe at the stem of the vessel.

36. A marine propulsion system, comprising:
 at least one vessel propeller;
 at least one electric motor by which the at least one vessel propeller is drivable;
 a converter-fed electrical power supply, adapted to supply electric power to the at least one electric motor, including, at least one drive machine; and at least one generator, adapted to be driven by the at least one drive machine, wherein at least one of the at least one electric motor and the at least one generator are in the form of three-phase synchronous machines, at least one of the at least one electric motor and the at least one generator includes a rotating field winding composed of high-temperature superconductor (HTSL) wire, each rotating field winding is arranged in a cryostat which is vacuum-insulated and by which the rotating field winding is cryogenically coolable to a temperature between 15 and 77 K, and the at least one electric motor, in the form of a three-phase synchronous machine and including the rotating field winding composed of HTSL wire, is arranged as an in-board motor by which the vessel propeller associated therewith is drivable via a shaft system.

37. A marine propulsion system, comprising:

at least one electric motor means for driving at least one vessel propeller; and supply means for supplying electric power to the at least one electric motor, the supply means including, at least one generator, wherein at least one of the at least one electric motor means and the at least one generator are in the form of three-phase synchronous machines, at least one of the at least one electric motor and the at least one generator includes a rotating field winding including high-temperature superconductor wire, the rotating field winding is arranged in a means for cryogenically cooling the rotating field winding to a temperature between 15 and 77 K, at least one of the at least one electric motor and the at least one generator includes an air gap three-phase winding composed of loomed copper conductors, arranged in an annular gap between a rotor and a laminated magnetic iron yoke, and the rotor, including the rotating field winding composed of HTSL wire, includes 6 to 12 poles.

38. The marine propulsion system as claimed in claim 37, wherein the marine propulsion system is in the form of a pod propulsion system, wherein the at least one electric motor is accommodated in a motor gondola arranged outside the vessel hull.

* * * * *